United States Patent [19]

Pausch et al.

[11] Patent Number: 5,387,371

[45] Date of Patent: Feb. 7, 1995

[54] FERROELECTRIC LIQUID-CRYSTALLINE MEDIA, AND THEIR USE IN ELECTRO-OPTICAL DEVICES

[75] Inventors: Axel Pausch, Seeheim-Jugenheim; Ulrich Finkenzeller, Plankstadt; Juliane Suermann, Darmstadt-Eberstadt, all of Germany; David Coates, Dorset, Great Britain

[73] Assignee: Merck Patent Gesellschaft Mit Beschrankter Haftung, Darmstadt, Germany

[21] Appl. No.: 128,189

[22] Filed: Sep. 29, 1993

[30] Foreign Application Priority Data

Sep. 30, 1992 [DE] Germany .............................. 4232788

[51] Int. Cl.$^6$ ............................ C09K 19/12; G02F 1/13
[52] U.S. Cl. ........................... 252/299.65; 252/299.66; 252/299.67; 252/299.61; 359/103
[58] Field of Search ................ 252/299.61, 299.66, 252/299.67, 299.65

[56] References Cited

U.S. PATENT DOCUMENTS

| | | | |
|---|---|---|---|
| 4,834,904 | 5/1989 | Krause et al. | 252/299.01 |
| 4,911,863 | 3/1990 | Sage et al. | 252/299.65 |
| 4,921,632 | 5/1990 | Nakamura et al. | 252/299.1 |
| 5,059,345 | 10/1991 | Kobayashi et al. | 252/299.61 |
| 5,116,527 | 5/1992 | Coates et al. | 252/299.61 |
| 5,198,149 | 3/1993 | Reiffenrath et al. | 252/299.61 |
| 5,217,644 | 6/1993 | Nohira et al. | 252/299.6 |
| 5,240,638 | 8/1993 | Kikuchi et al. | 252/299.61 |

FOREIGN PATENT DOCUMENTS

| | | |
|---|---|---|
| 0206228 | 12/1986 | European Pat. Off. . |
| 3916508 | 11/1990 | Germany . |
| 87/07890 | 12/1987 | WIPO . |
| 89/06678 | 7/1989 | WIPO . |

*Primary Examiner*—Robert L. Stoll
*Assistant Examiner*—C. Harris
*Attorney, Agent, or Firm*—Millen, White, Zelano, & Branigan

[57] ABSTRACT

The invention relates to a ferroelectric liquid-crystalline medium having improved low-temperature behavior, pronounced bistability and a phase sequence containing the phases isotropic, cholesteric, smectic A and chiral smectic C, comprising an achiral base material having a broad smectic C phase and at least one chiral dope which induces a spontaneous polarization of from 5 to 40 nCcm$^{-2}$ in the achiral base material, characterized in that the medium has a chiral smectic C phase which is stable at least to $-30°$ C., and to the use thereof in electro-optical devices.

13 Claims, No Drawings

FERROELECTRIC LIQUID-CRYSTALLINE MEDIA, AND THEIR USE IN ELECTRO-OPTICAL DEVICES

SUMMARY OF THE INVENTION

The invention relates to a ferroelectric liquid-crystalline medium having improved low-temperature behavior, pronounced bistability and a phase sequence containing the phases isotropic, cholesteric, smectic A and chiral smectic C, comprising an achiral base material having a broad smectic C phase and at least one chiral dope which induces a spontaneous polarization of 5-40 nCcm$^{-2}$ in the achiral base material, characterized in that the medium has a chiral smectic C phase which is stable at least to $-30°$ C., and to the use thereof in electro-optical devices.

Due to the unusual combination of anisotropic and fluid behavior, liquid-crystalline media have recently found a wide range of applications in electro-optical switching and display devices. Their electrical, magnetic, elastic and/or thermal properties can be utilized to cause changes in alignment. Optical effects can then be achieved, for example with the aid of birefringence, the inclusion of dichroically absorbing dye molecules ("guest-host mode") or light scattering.

In order to satisfy the constantly increasing requirements of practice in the various areas of application, there is a growing demand for novel improved liquid-crystal mixtures and thus also for a large number of new mesogenic compounds.

This applies both to the areas in which nematic LC phases (for example TN=twisted nematic, STN=supertwisted nematic, SBE=supertwisted birefringence effect, ECB=electrically controlled birefringence) are used and to those having smectic LC phases (for example ferroelectric and electroclinic).

Due to their short response times and their bistability, ferroelectric liquid crystals have attracted particular interest as a display medium in electro-optical components (for example Lagerwall et al., "Ferroelectric Liquid Crystals for Displays", SID Symposium, October Meeting 1985, San Diego, Calif., USA).

For practical use of ferroelectric liquid crystals in electro-optical displays, chiral, tilted smectic phases, such as S$_c$ phases, are required [R. B. Meyer, L. Liébert, L. Strzelecki and P. Keller, J. Physique 36, L-69 (1975)], which are stable over a broad temperature range. This aim can be achieved by means of compounds which themselves form such phases, for example S$_c$ phases, or by doping compounds, which do not form chiral, tilted smectic phases, with optically active compounds [M. Brunet, C. Williams, Ann. Phys., 3, 237 (1978)].

Use of ferroelectric liquid-crystal mixtures in electro-optical components requires a uniform planar alignment of the liquid crystals in order to achieve high contrast. It has been found that a uniform planar alignment in the S$_c$ phase can be achieved if the phase sequence of the liquid-crystal mixture is, with decreasing temperature: isotropic→nematic→smectic A→smectic C (see, for example, K. Flatischler et al., Mol. Cryst. Liq. Cryst. 131, 21 (1985); T. Matsumoto et al., p. 468-470, Proc. of the 6th Int. Display Research Conf., Japan Display, 30 Sep. to 2 Oct. 1986, Tokyo, Japan; M. Murakami et al., ibid., p. 344-347).

An additional condition which must be satisfied for ferroelectric (chiral smectic) liquid-crystal mixtures is that the pitch of the helix is large, i.e. greater than 5 μm, in the S$_c$* phase and very large, i.e. greater than 10 μm, or infinite in the N* phase.

There is a recent trend towards employing ferroelectric liquid-crystal displays in "shelf label" applications, i.e. for price display plates in consumer markets.

The advantage of such ferroelectric display plates is that price changes can be carried out from a central point, with the displayed prices remaining without addressing until the next change due to the bistability of the ferroelectric display.

Particular requirements are made of the low-temperature stability in such displays since they are preferably employed in the frozen goods sector.

All the ferroelectric media disclosed hitherto have operating ranges well above $-10°$ C.

An object of the present invention is to provide ferroelectric media which satisfy the particular low-temperature requirements of shelf label applications.

Finally, in addition to thermal, chemical and photochemical stability, a small optical anistropy Δn, preferably of 0.13 for an LC layer thickness in the display of 2 μm, and of 0.17 for a layer thickness of 1.5 μm, and a small positive or preferably negative dielectric anistropy Δε is required (S. T. Lagerwall et al., "Ferroelectric Liquid Crystals for Displays", SID Symposium, Oct. Meeting 1985, San Diego, Calif. USA).

The totality of these requirements can only be achieved by means of mixtures comprising a plurality of components. The base (or matrix) used preferably comprises compounds which, as far as possible themselves already have the desired phase sequence I→N→S$_A$→S$_c$. Further components of the mixture are often added in order to reduce the melting point and to broaden the S$_c$ and usually also N phase, to induce optical activity, for pitch compensation and to match the optical and dielectric anisotropies, but, for example, the rotational viscosity should if possible not be increased.

It is known that certain derivatives of phenyl benzoates, in particular the relatively unstable p-alkoxyphenyl p-alkoxybenzoates, are able to form S$_c$, S$_A$ and N-phases (D. Demus and H. Zaschke, "Flüssige Kristalle in Tabellen" [Liquid Crystals in Tables], VEB Deutscher Verlag für Grundstoffindustrie, Leipzig 1974, pp. 68-69, and in addition can be converted into ferroelectric liquid-crystal mixtures by addition of optically active dopes [L.A. Beresnew et al., Ferroelectrics 59 [321]/1 (1984)].

It is furthermore known that relatively low melting points and a broadening of the desired liquid-crystalline phases can be achieved by mixing a plurality of liquid-crystalline compounds [D. Demus et al., Mol. Cryst. Liq. Cryst. 25, 215 (1974), J. W. Goodby, Ferroelectrics 49, 275 (1983)], and that the melting point depression is more pronounced the greater the structural difference between the mixture components (J. S. Dave et al., J. Chem. Soc. 1955, 4305). The assumption would therefore have been that particularly low mixture melting points and thus low phase-transition points of the S$_c$ phase are obtained when compounds are mixed which, on the one hand, are significantly different structurally, but on the other hand are sufficiently similar to be readily miscible.

WO 89/06678 discloses that laterally monofluorinated phenyl benzoates and phenylbiphenyl carboxylates are suitable as components of ferroelectric liquid-crystalline media.

GB 2,198,743 discloses that laterally monofluoroinated terphenyls are suitable as components of ferroelectric media.

PCT/EP88/00724 describes the use of laterally difluoroinated terphenyls in ferroelectric media.

None of said documents contain any indication that a combination of fluorinated phenyl benzoates, fluorinated terphenyls and fluorinated phenyl biphenylcarboxylates gives ferroelectric media having a broad $S_c^*$ phase at low temperatures, high spontaneous polarization, short response times and pronounced bistability, which are particularly suitable for shelf label applications.

In spite of the successes achieved by the known mixtures in the provision of novel liquid-crystalline materials, the development of liquid-crystal base mixtures, but in particular also of ferroelectric liquid-crystal mixtures, can in no way be regarded as complete. The manufacturers of display elements (displays) are interested in a broad range of various mixtures with the individual components of the display elements or of the cells (for example, the alignment layer) which allow conclusions to be drawn on the quality of the liquid-crystalline mixtures.

An object of the present invention is therefore to provide compositions of suitable components for ferroelectric liquid-crystalline mixtures which satisfy as many as possible of the above criteria, have, in respect of bistability, moderate viscosity values, have, in particular, a low melting point, result in improved contrast in a display, have a liquid-crystalline phase width, with the desired phase sequence, which is specifically adjusted to the application, and only crystallize at very low temperatures, or preferably not at all, when the display is cooled (crystallization point < melting point).

Upon further study of the specification and appended claims, further objects and advantages of this invention will become apparent to those skilled in the art.

The invention thus relates to a ferroelectric liquid-crystalline medium having improved low-temperature behavior, pronounced bistability and a phase sequence containing the phases isotropic, cholesteric, smectic A and chiral smectic C, comprising an achiral base material having a broad smectic C phase and at least one chiral dope which induces a spontaneous polarization of preferably about 5–40 nCcm$^{-2}$ in the achiral base material, characterized in that the medium has a chiral smectic C phase which is stable to at least $-30°$ C.

Preferably, the amount of achiral base material is about 85–98%, in particular, 90–95%, based on the total weight of the liquid-crystalline medium. The amount of chiral dopant is preferably about 2–15%, especially 5–10%, based on the total weight of the liquid-crystalline medium.

In addition, the spontaneous polarization is preferably greater than 5 nCcm$^{-2}$, especially 7–15 nCcm$^{-2}$ and, in particular, 8–12 nCcm$^{-2}$. The width of the chiral smectic C phase is preferably greater than 70° C., especially greater than 75° C., and in particular 80°–100° C.

Preferred embodiments are:
(a) Media in which the chiral smectic C phase has a phase width of at least 70° C.;
(b) Media in which the achiral base material essentially comprises mesogenic compounds which contain at least one laterally fluorinated 1,4-phenylene group;
(c) Media in which the achiral base material contains laterally fluorinated phenyl biphenyl carboxylates, phenyl benzoates and terphenyls,
in particular in which the achiral base material contains three components A, B and C,
where component A comprises at least one compound selected from the group consisting of formulae I and II:

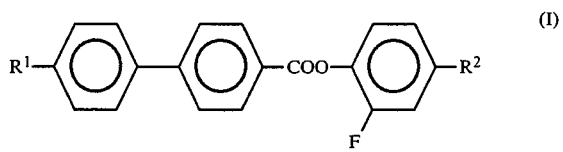

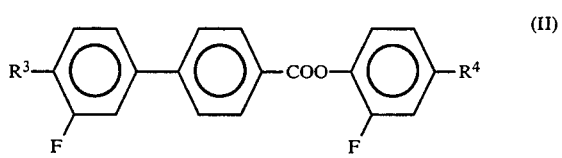

in which $R^1$, $R^2$, $R^3$ and $R^4$ are each, independently of one another, a straight-chain or branched alkyl or alkoxy group having 5 to 18 carbon atoms;
where component B comprises at least one compound of the formula III

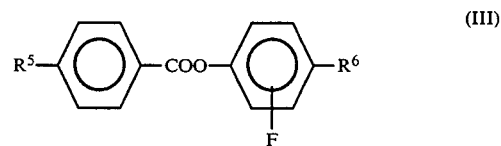

in which $R^5$ and $R^6$, independently of one another, are as defined for $R^1$ to $R^4$;
and where component C comprises at least one compound of the formula IV

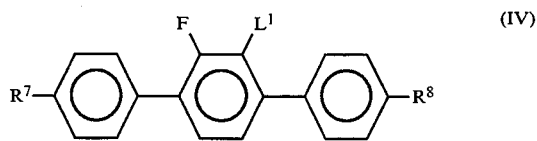

in which $R^7$ is as defined for $R^1$, $R^8$ is straight-chain or branched alkyl, alkoxy or oxaalkyl group having 4 to 18 carbon atoms, and $L^1$ is F or H,
in particular in which the achiral base material contains
preferably about 40–80% by weight of component A, preferably about 20–40% by weight of component B, and preferably about 15–35% by weight of component C, based on the total amount of components A, B and C;
(d) Media in which the amount of component A is 35–90%, especially 38–65%, based on the total weight of the achiral base mixture; the amount of component B is 20–40%, especially 25–35%, based on the total weight of the achiral base mixture; the amount of component C is 15–35%, especially 20–30%, based on the total weight of the achiral base mixture;
(e) Media in which component A contains 55–75%, especially 60–70%, compound(s) of formula I and 25–45%, especially 30–40%, compound(s) of formula II;

(f) Ferroelectric liquid-crystalline media in which component A comprises:
preferably about 60–90% by weight of compounds of the formula I in which
R$^1$ is alkyl or alkoxy having 5 to 12 carbon atoms, and R$^2$ is in each case alkyl having 5 to 12 carbon atoms; and
preferably about 10–40% by weight of compounds of the formula II in which
R$^1$ is alkoxy having 5 to 12 carbon atoms, and R$^2$ is alkyl having 5 to 12 carbon atoms;

(g) Ferroelectric liquid-crystalline media in which the chiral dope is a compound of the formula V:

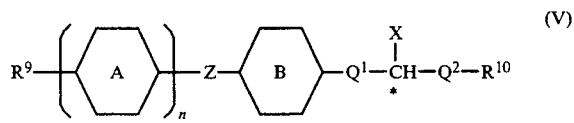

in which R$^9$ and R$^{10}$ are each, independently of one another, alkyl or alkoxy having 9 to 12 carbon atoms,

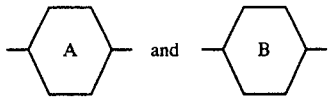

are each, independently of one another,

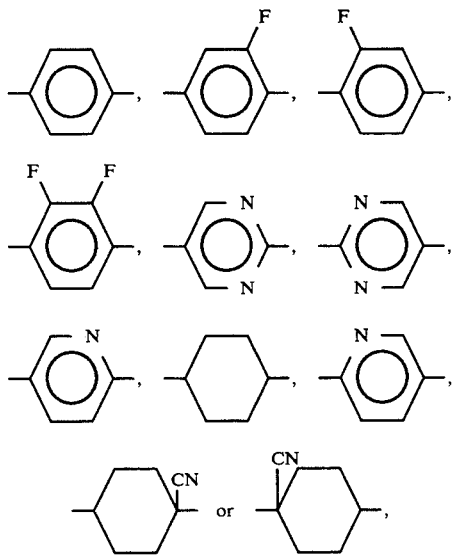

Q$^1$ and Q$^2$ are each, independently of one another —O—, —COO—, —O—CO—, —(CH$_2$)$_m$—, —(CH$_2$)$_m$O— or —O(CH$_2$)$_m$—, where m=1, 2 or 3, or a single bond, Z is —COO—, —OCO— or a single bond, X is F, Cl, CN, CF$_3$ or CH$_3$, wherein X is not the same as Q$^2$—R$^{10}$, and n is 1 or 2, in particular in which Z is a single bond, X is F, Q$^1$ is —(CH$_2$)$_m$— or —O—(CH$_2$)$_m$—, and Q$^2$ is a single bond;

(h) Ferroelectric media in which the achiral base material additionally contains at least one compound of the formula VI

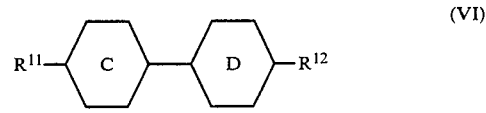

in which
R$^{11}$ and R$^{12}$ are each, independently of one another, alkyl, alkoxy or alkanoyloxy having 5 to 18 carbon atoms,

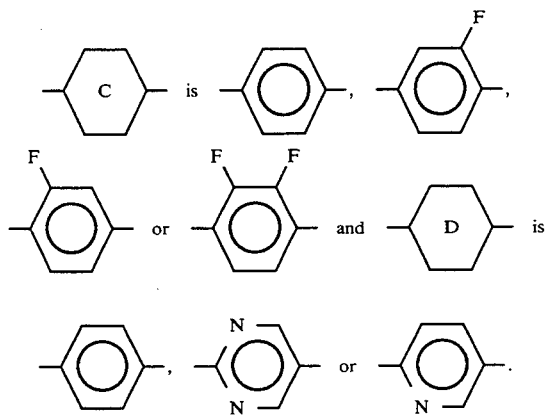

The invention furthermore relates to an electro-optical component containing a ferroelectric medium according to the above description, and to the use of such ferroelectric liquid-crystalline (FLC) media in electro-optical switching and display elements.

Particular preference is given to an LC mixture in which the achiral base mixture contains at least one compound of the formula Ia,

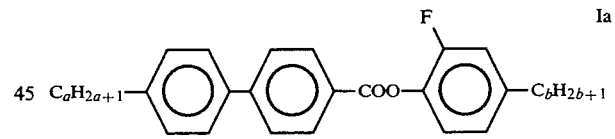

in which a and b are each an integer from 5 to 18, preferably from 5 to 12,
at least one compound of the formula Ib

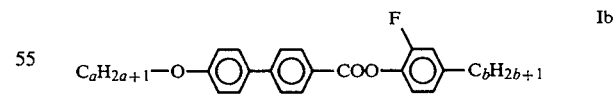

in which a and b are as defined for formula Ia,
at least one compound of the formula IIa

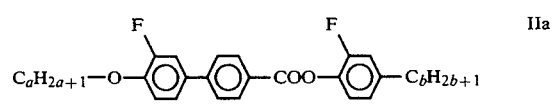

in which a and b are as defined for formula Ia,
at least one compound of the formula IIIa

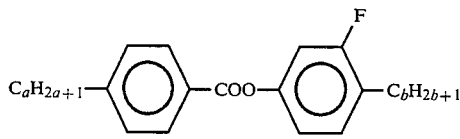

which a and b are as defined for formula Ia,
and at least one compound of the formula IIIb

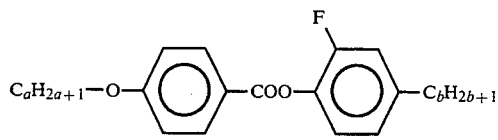

in which a and b are as defined for the formula Ia.

In the general formulae I and II, $R^1$ and $R^3$ are an alkyl or alkoxy chain having 5 to 18 carbon atoms, preferably having 5 to 12 carbon atoms, $R^2$ and $R^4$ are each an alkyl or alkoxy chain having 5 to 18 carbon atoms, preferably an alkoxy chain having 6 to 12 carbon atoms.

In the general formula III, $R^5$ and $R^6$ are each an alkyl or alkoxy chain having 5 to 18 carbon atoms, preferably each an alkoxy chain having 5 to 12 carbon atoms.

In general formula IV, $R^7$ is an alkyl or alkoxy chain having 5 to 18, preferably 5 to 12, carbon atoms, $R^8$ is an alkyl, alkoxy or oxaalkyl chain having 4 to 18 carbon atoms, preferably a 2-oxaalkyl chain having 4 to 12 carbon atoms.

The preparation of the individual compounds of the achiral components A, B and C is described, for example, in:

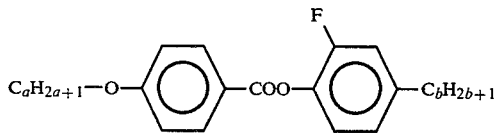

The preparation of compounds of formula V is described in U.S. Pat. Nos. 5,089,168; 5,182,047; EP 0 237 007; and WO 90/13611.

The preparation of compounds of formula VI is described, for example, in U.S. Pat. No. 5,182,047.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications cited above and of corresponding German application P 42 32 788.1, filed Sep. 30, 1992, are hereby incorporated by reference.

EXAMPLES

EXAMPLE 1

A mixture of the following 8 components

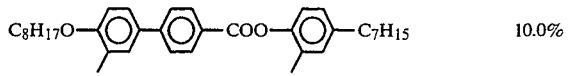 10.0%

 25.0%

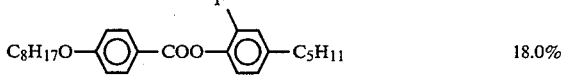 18.0%

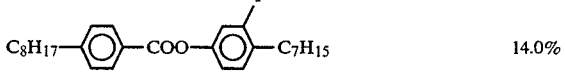 14.0%

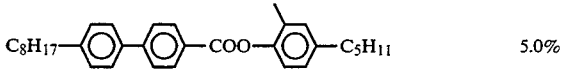 5.0%

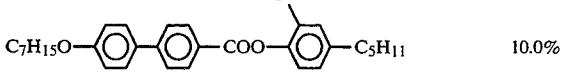 10.0%

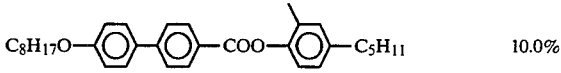 10.0%

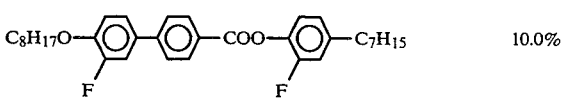 8.0% has the following phase ranges:
a) C −35 $S_c^*$ 49 $S_A$ 54 Ch 97 I
and, at 20° C.:
a spontaneous polarization of 9.3 nCcm$^{-2}$, a tilt angle of 25° and a response time of 122 μs.

EXAMPLE 2

A mixture of the following 8 components

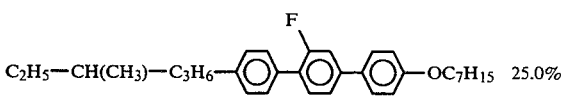 10.0%

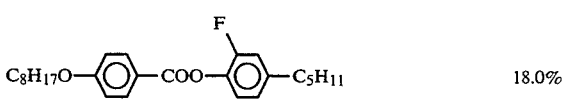 25.0%

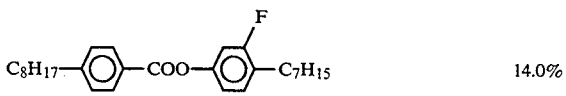 18.0%

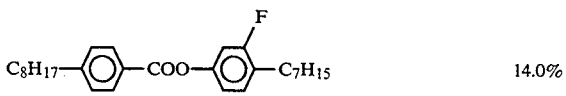 14.0%

-continued

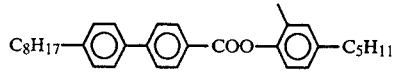 5.0%

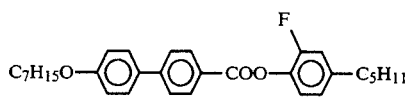 10.0%

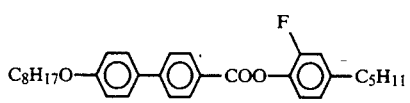 10.0%

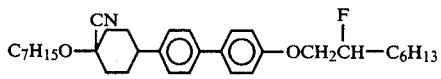 8.0% has an $S_c^*$ phase down to $-35°$ C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A ferroelectric liquid-crystalline medium exhibiting low-temperature behavior and bistability and comprising:
   an achiral base material having a broad smectic C phase, and at least one chiral dope which induces a spontaneous polarization of 5–40 nCcm$^{-2}$ in said achiral base material,
      wherein said achiral base material contains laterally fluorinated phenyl biphenyl carboxylates, laterally fluorinated phenyl benzoates, and laterally fluorinated terphenyls,
      wherein said medium has a phase sequence containing the phases isotropic, cholesteric, smectic A and chiral smectic C, and
      said medium has a chiral smectic C phase which is stable at at least $-30°$ C. and has a phase width of at least 70° C.

2. A medium according to claim 1, wherein said achiral base material contains components A, B and C,
   wherein component A comprises at least one compound selected from the group consisting of formulae I and II:

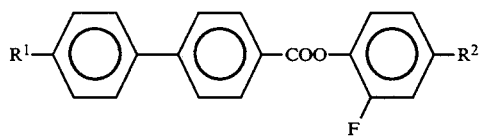 (I)

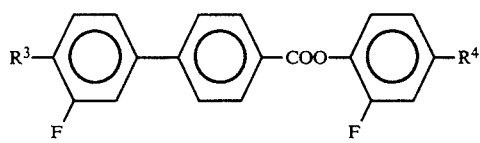 (II)

in which $R^1$, $R^2$, $R^3$ and $R^4$ are each, independently of one another, a straight-chain or branched alkyl or alkoxy group having 5–18 carbon atoms;
wherein component B comprises at least one compound of formula III

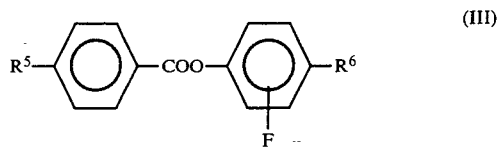 (III)

in which $R^5$ and $R^6$, independently of one another, are each a straight-chain or branched alkyl or alkoxy group having 5–18 carbon atoms; and
wherein component C comprises at least one compound of formula IV

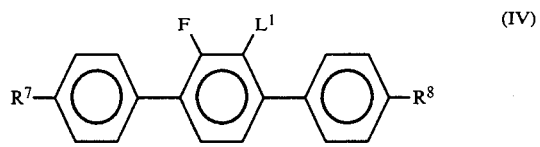 (IV)

in which $R^7$ is a straight-chain or branched alkyl or alkoxy group having 5 to 18 carbon atoms, $R^8$ is a straight-chain or branched alkyl, alkoxy or oxaalkyl group having 4 to 18 carbon atoms, and $L^1$ is H or F.

3. A ferroelectric liquid-crystalline medium according to claim 2, wherein said achiral base material contains
   40–80% by weight of component A,
   20–40% by weight of component B, and
   15–35% by weight of component C,
   base on the total amount of components A, B and C.

4. A ferroelectric liquid-crystalline medium according to claim 2, wherein component A comprises:
   60–90% by weight of compounds of formula I in which $R^1$ is alkyl or alkoxy having 5–12 carbon atoms, and $R^2$ is in each case alkyl having 5–12 carbon atoms; and
   10–40% by weight of compounds of formula II in which $R^1$ is alkoxy having 5–12 carbon atoms, and $R^2$ is alkyl having 5–12 carbon atoms.

5. A ferroelectric liquid-crystalline medium according to claim 1, wherein said chiral dope is a compound of formula V:

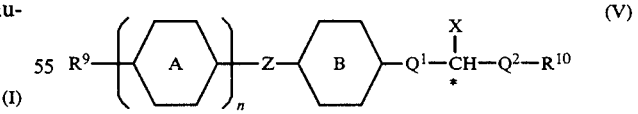 (V)

in which
$R^9$ and $R^{10}$ are each, independently of one another, alkyl or alkoxy having 9–12 carbon atoms;

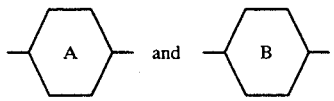

are each, independently of one another,

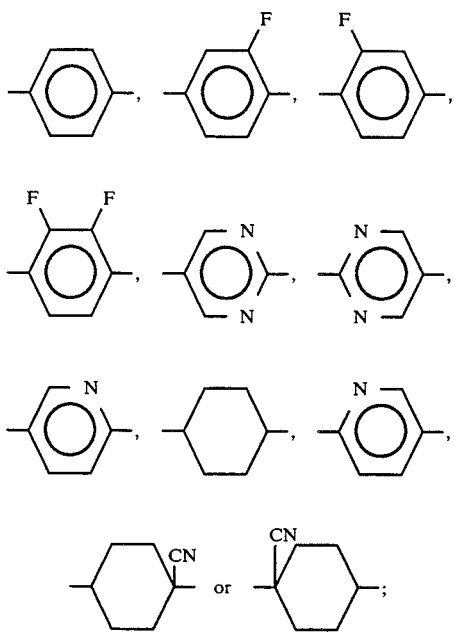

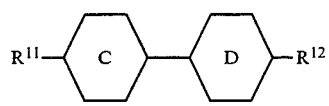

in which

R[11] and R[12] are each, independently of one another, alkyl, alkoxy or alkynoyloxy having 5 to 18 carbon atoms;

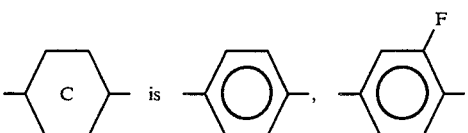

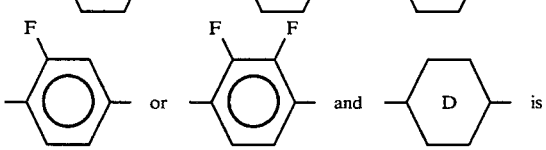

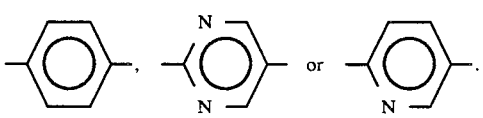

$Q^1$ and $Q^2$ are each, independently of one another, —O—, —COO—, —O—CO—, —(CH$_2$)$_m$—, —(CH$_2$)$_m$O— or —O(CH$_2$)$_m$—, or a single bond;

Z is —COO—, —OCO— or a single bond;

X is F, Cl, CN, CF$_3$ or CH$_3$;

m is 1, 2 or 3; and n is 1 or 2.

6. A ferroelectric medium according to claim 5, wherein

Z is a single bond;

X is F;

$Q^1$ is —(CH$_2$)$_m$— or —O—(CH$_2$)$_m$—; and $Q^2$ is a single bond.

7. A ferroelectric medium according to claim 1, wherein said achiral base material contains at least one compound of formula VI 8. A medium according to claim 1, wherein said medium contains 90–95 wt. % of said achiral base material based on the total weight of the medium and 5–10 wt. % of said chiral dopant based on the total weight of the medium.

9. A medium according to claim 1, wherein said chiral dopant induces a spontaneous polarization of 7–15 nCcm$^{-2}$.

10. A medium according to claim 1, wherein said chiral smectic C phase has a phase width of 80°–100° C.

11. A medium according to claim 3, wherein said medium contains 35–90 wt. % component A, 20–40 wt. % component B, and 15–35 wt. % component C, in each case being based on the total weight of the achiral base mixture.

12. In an electro-optical display component containing a ferroelectric medium, the improvement wherein said medium is one of claim 1.

13. In a method of generating an electro-optical display using an electro-optical display component, wherein said component is one of claim 12.

* * * * *